July 2, 1940.　　　C. L. MURPHY　　　2,206,363
VALVE FOR AN OIL TANK
Filed Sept. 7, 1939　　　2 Sheets-Sheet 1
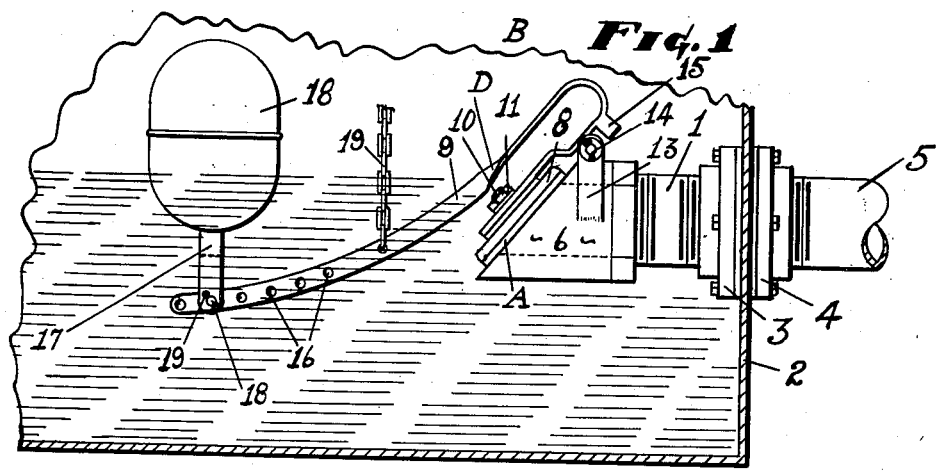
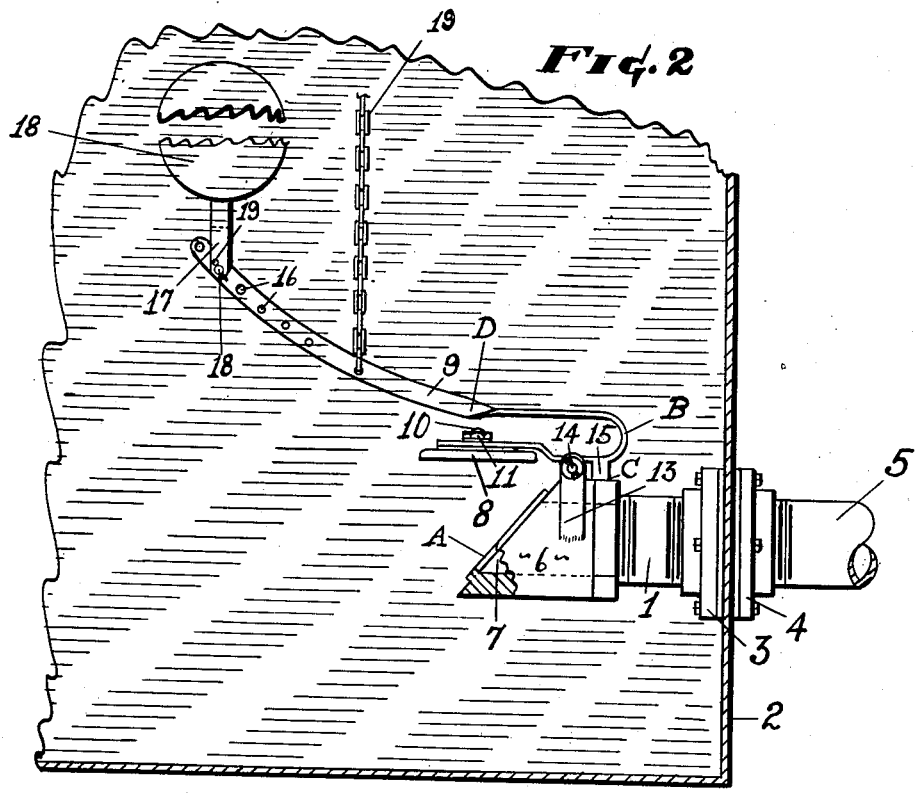
INVENTOR.
CLARANCE L. MURPHY
BY U. G. Charles
ATTORNEY.

July 2, 1940.  C. L. MURPHY  2,206,363
VALVE FOR AN OIL TANK
Filed Sept. 7, 1939   2 Sheets-Sheet 2
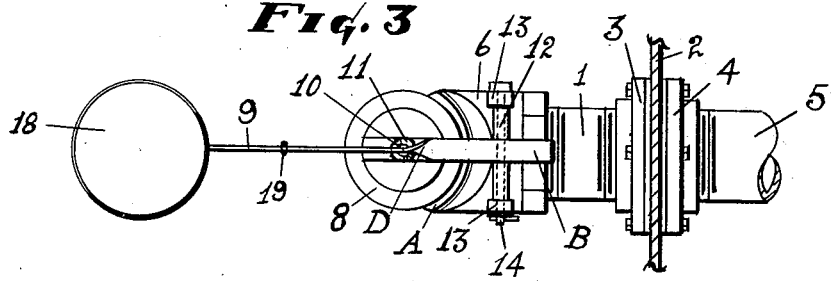
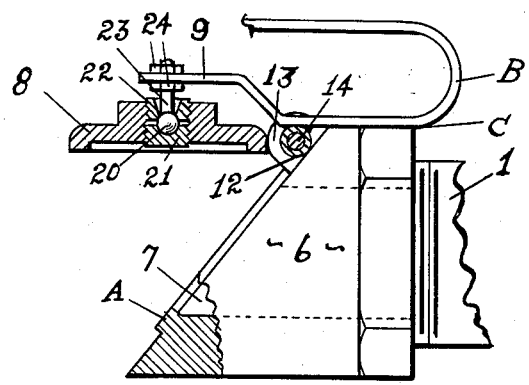
INVENTOR.
CLARANCE L. MURPHY
BY U.Y. Charles
ATTORNEY.

Patented July 2, 1940

2,206,363

UNITED STATES PATENT OFFICE 2,206,363

VALVE FOR AN OIL TANK

Clarance L. Murphy, Newton, Kans.

Application September 7, 1939, Serial No. 293,752

2 Claims. (Cl. 137—104)

My invention relates to improvements in valves for oil tanks or the like, whereby the valve is opened automatically by its buoyant feature as the oil level rises thereabove, and the valve being gravitately closed when the oil recedes therebelow, the latter action being to avoid air intake at the valve when the tank is empty.

A further object of my invention is to provide an adjustment for the buoyant power.

A still further object is to provide a means whereby the valve may rock sufficient to adjust for unusual wear or sediment accumulation between the valve and its seat.

These and other objects will hereinafter be more fully explained, reference being had to the accompanying drawings forming a part of this specification, in which like characters will apply to like parts in the different views:

Referring to the drawings:

Fig. 1 is a side view of the valve closed, and a fragmentary part of a tank.

Fig. 2 is a side view showing the valve open.

Fig. 3 is a top or plan view of Fig. 2.

Fig. 4 is a sectional view of the valve as modified for rocking adjustment to seal the intake opening.

The invention herein disclosed consists of a valve mechanism comprising a nipple 1 secured to the wall of a tank 2 through the medium of threaded flanged collars 3 and 4 secured oppositely and in registry on the said tank wall and communicating therethrough; being so arranged the nipple of said valve mechanism threadedly engages with the inside collar 3 while a pipe line 5 threadedly engages with the outside collar 4 whereby connection is made to market the oil. Threadedly connected to the other end of the nipple is a fitting 6 having an inlet opening 7, the outer end of which is slantingly positioned from a vertical plain and there is an annular outward extending seat A, circumscribing the opening to receive a disc-like valve element 8 seating thereon and to which a lever 9 is removably secured by a threaded stud 10 extending through the lever and a nut 11 engaging thereon. The said lever is rockably connected to the fitting through the medium of a sleeve 12 to which said lever is connected, the sleeve being positioned between ears 13 that are apertured to receive a bolt 14 extending therethrough and through said sleeve. The said sleeve being of an appreciable length is means to avoid serious lateral movement of the valve as the sleeve loosely fits on the bolt for free rocking movement. It will be seen that the lever is provided with a return bend as at B, the lower portion of which has a lug 15 secured thereto and adapted to strike on the fitting as at C whereby the disc valve is horizontally disposed in its maximum open position, and furthermore, it will be seen that the lever has a twist as at D through an arc of ninety degrees to vertically position with respect to the width thereof, that portion of the lever from its twist to its outer end; while the portion from the twist toward the return bend is horizontally disposed, and the portion of the lever between the sleeve and the end where it joins the valve may be resilient, sufficient to maintain a close fit of the valve on its seat. The extension of the lever inward from its twist has a plurality of apertures 16 spaced therealong from the outer end thereof to selectively connect the stem 17 of a float 18 as buoyant means to rock said lever upward to open the valve as shown in Fig. 2 and maintain the same by the oil level extending thereabove, and the said valve being gravitately closed as the depth of the oil recedes to the valve opening or sufficient to relieve buoyant power of the float. It will be understood that the said stem is bifurcated at its lower end to straddle the lever and is secured rockable by a pin 18 extending through the legs of the bifurcation and a selected aperture in the lever, the pin being retained in its position by a cotter key 19 extending through an aperture near the outer end of the pin; the float being so connected is means to retain its position upward of the lever whereby added gravity is had to close the valve, and furthermore the float will rock vertically from its pivot connection buoyantly as the oil rises in the tank.

The said valve is positioned upward from the bottom of the tank to avoid basic sediment accumulation from entering the valve opening, and the valve being so positioned is means to comply with established rules, and furthermore, to avoid necessity of removing the sediment at close intervals.

As an emergency to open the valve should the same become inoperative for any reason, I have secured a chain 19 to the lever intermediate of its length, said chain being of sufficient length to extend upward to an accessible point in the tank whereby the valve position may be determined.

In Fig. 4 is shown the valve modified with respect to its connection to the lever whereby the valve is rockably carried by a ball 20 and socket elements 21 and 22 that threadedly engages in a threaded aperture axially extending through the valve, while socket 22 is bored axially and funneled outward to receive the ball neck 23 rockable therein, by which arrangement the valve has a restricting wobble or rocking movement in all directions to insure the valve closing whereby resilience of the lever adjacent the valve is not required. The said stem is threaded at its outer portion which extends through an aperture at the end of the lever and is secured thereto by lock nuts 24.

The figure view thus modified also includes a change of the rockable pivot moving the same toward the opening of the fitting, whereby the said lug 15 adjacent the return bend of the lever is omitted and in lieu thereof the lever structure is adapted to strike on the fitting as at C heretofore described, and such other modifications may be made as lie within the scope of the appended claims.

Having fully described my invention what I claim as new and desire to secure by Letters Patent is:

1. In a valve for an oil tank, a hollow fitting internally threaded from one end a distance inward, the other end slantingly crossing the axis of the hollow, a leaf lever having a return bend for one end portion thereof, whereby two legs are formed, one of which is shorter than the other, a pipe secured transversely to the short leg intermediate of its length, ears spaced apart, outwardly extending and integrally joined to the fitting at its slanting end, between which the pipe will engage longitudinally, said ears being bored to receive a bolt therethrough, said bolt extending through said pipe, by which means the lever is rockably connected to the fitting, a disc-like valve secured to the short leg outward from the pipe opposite the bend to move to and from the slanting end of the fitting to open and close the hollow thereof, means to connect the fitting to the wall of a tank in such a way as to communicate with a pipe line adapted to extend from and be connected to said tank, the longer leg of the lever having a plurality of apertures therethrough and spaced therealong, a float and means to attach the same to the lever at a selected point with respect to the apertures, all as and for the purpose specified.

2. In a valve for an oil tank, a fitting axially bored, a nipple threadedly engaging in one end of the bore, means to connect the nipple to the wall of an oil tank to register with an opening thru said wall, the end of said fitting opposite the nipple being on an inward slant and a pair of ears adjacent the termination of the inward slant, the ears spaced apart and being apertured, a hollow pipe extending from one ear to the other, the hollow being in registry with the aperture with the ears and a pin extending through the ears and said pipe and means to secure the pin against removal whereby the pipe is trunnioned, a leaf lever having a return bend whereby two legs are formed one being shorter than the other, the short leg being secured to tne pipe intermediate of its ends, and crossing the same at right angles, a rockable valve secured to the short end in working relation to the slanting end of the fitting, and adapted to close the bore when rocked to engagement with said slanting end, the longer leg having a twist through an arc of ninety degrees whereby the lever is positioned vertically with respect to a vertical, longitudinal cross-section from the twist outward, a float having a bifurcated stem, the bifurcation to straddle the edge of the lever and means to secure the stem thereto selectively along said lever, and the lever being so formed and pivotally connected to the pipe causes both ends of the lever to move in the same direction simultaneously, whereby the valve is opened and closed.

CLARANCE L. MURPHY.